JOHN TUNBRIDGE OF NEWARK, NEW JERSEY.

Letters Patent No. 85,258, dated December 22, 1868.

IMPROVED METHOD OF EXTRACTING GOLD AND SILVER FROM THEIR ORES.

The Schedule referred to in these Letters Patent and making part of the same.

*To all whom it may concern:*

Be it known that I, JOHN TUNBRIDGE, of the city of Newark, in the county of Essex, and State of New Jersey, have invented an Improved Method of Extracting Gold and Silver from their Ores, possessing the advantage of bringing about the chemical change necessary for their effective amalgamation, with a great economy in time and materials over other systems now in use. Also, a method of treating refractory or rebelde ores, containing lime and earthy carbonates, oxides, and metallic carbonates.

Description.

Owing to the great diversity in ores in different localities, and frequently in the same mine, in order to clearly comprehend my method, it will be necessary to select ores of known properties, those known as docile metal or pateo ores being preferable for my formula. The following proportions are not intended to be definite in all cases, but subject to variations, according to circumstances and differences in the character of the ores.

Formula 1.

With one ton of the above-named ores, ground sufficiently fine, and of the proper consistence, placed in the pateo or paved yard, incorporate three pounds of salt and two pounds of sulphate of copper, prepared in the following manner:

Dissolve the salt and sulphate of copper in separate wooden utensils, with as little water as may be necessary for the purpose; mix the copper with the salt, and thoroughly incorporate the whole. On the following day make a composition of metallic mercury, copper, and chloride of soda, as follows: Take eight ounces of salt and eight ounces of sulphate of copper, dissolve to supersaturation, and mix them together. Of mercury, squeeze through a cloth eight times the weight of the silver known to be contained in the ores, stirring gently a little at a time. When the mercury loses most of its metallic appearance, the whole is incorporated. From three to five days after this operation, according to the state of the weather, incorporate four pounds of sulphate of copper, and continue the process in the usual way until finished. When magistral, or pyrites of copper, are used instead of sulphate of copper, the pyrites must be calcined in a reverberatory furnace, in the usual manner. After cooling, mix well eight pounds of salt with twenty-five pounds of magistral, gradually raising the temperature until it attains a dull red heat, mixing and keeping it well turned over, about two hours being generally required for this last operation. When cold, it is ready for use, and in this state the action of the atmosphere will not cause it to deteriorate. With one ton of the lama or ground ores, prepared for receiving the reducing-materials, incorporate eight pounds of the magistral, calcined as above, providing it contains thirty or thirty-three per cent. of sulphate of copper, sulphate of copper being preferable for making the composition of metallic mercury and salt. After the expiration of a few days, incorporate ten pounds of calcined magistral, without the addition of salt, and finish as usual.

I treat ores known as rebeldes or refractory ores in the following manner:

With one ton of ore prepared for the reducing-materials, I incorporate two pounds of hyposulphate of soda, dissolved in water, leaving it in contact for a few days, and proceed as with docile ores. In extracting gold by amalgamation, I use the deoxidizing-materials, as hyposulphate of soda and potash, the cyanides, &c., in conjunction with mercury; also, the composition of salt, sulphate of copper, and mercury, which I prefer, and use in the following manner: With one ton of the ground ore ready to be operated upon, I incorporate the usual quantity of the composition of salt, mercury, and sulphate of copper, as before directed, allowing this combination about one-third of the time usually taken for extraction. I then incorporate three pounds of sulphate of copper, or eight pounds of magistral, and continue as usual. If iron pans or iron machinery be used in reducing, a less quantity of the magistral, or sulphate of copper, will be required. In amalgamating gold-ores containing carbonate of lime or metallic carbonates, and oxides of the inferior metals, I prefer the use of hyposulphate of soda, two pounds to the ton of ore, in conjunction with mercury, and combined in the usual way. In the extraction of gold by cyanides, I incorporate with one ton of the ore one pound of cyanide of potash, with the usual quantity of mercury, keeping it revolving in closed barrels, or other suitable vessels.

Explanatory Notes.

The mutual decomposition of the chloride of soda and sulphate of copper, previous to incorporation, is for the purpose of effecting a better interchange of elements than would take place if they were mixed with the great mass of ores. The combination of the salt, copper, and mercury causes them to react better together than they would if disseminated in the great mass of ores.

The object of incorporating the calcined pyrites and sulphate of copper, after the composition, is for the purpose of creating an electro-chemical agency, the hydrogen combining with the chlorine of the mercury formed in the process, and copper and the oxygen forming the oxide of copper.

Having thus described my invention,

What I claim as new, and desire to secure by Letters Patent, is—

1. The method of combining metallic mercury, salt, or chloride of soda, and sulphate of copper, substantially as and for the purpose set forth.

2. The application and use of sulphur and its salts, substantially as and for the purpose set forth.

3. The application and use of the cyanides, for the extraction of gold, substantially as and for the purpose set forth.

JOHN TUNBRIDGE.

Witnesses:
   H. C. COVERT,
   JAMES PERRY.